Aug. 21, 1934.  G. C. MONCKMEIER  1,971,078
BEARING CAP FINISHING DEVICE
Filed June 18, 1928   2 Sheets-Sheet 1
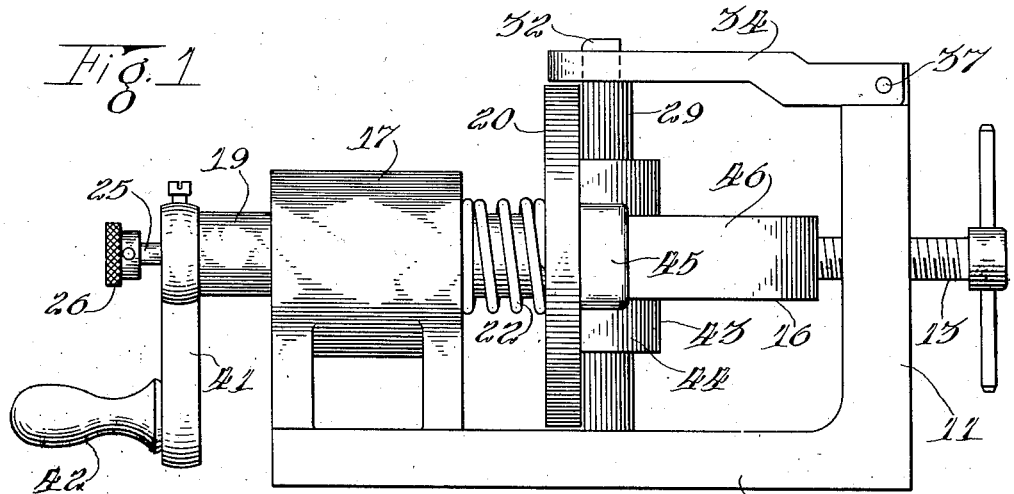
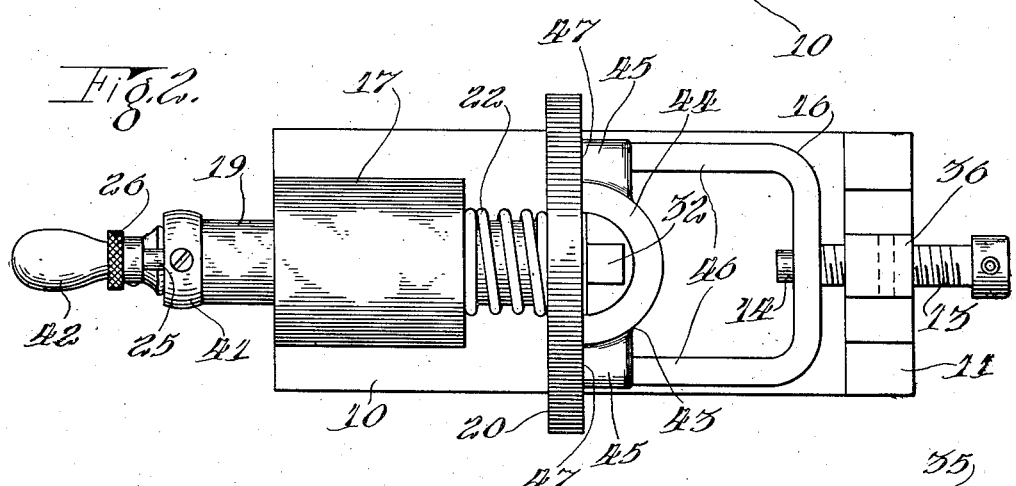
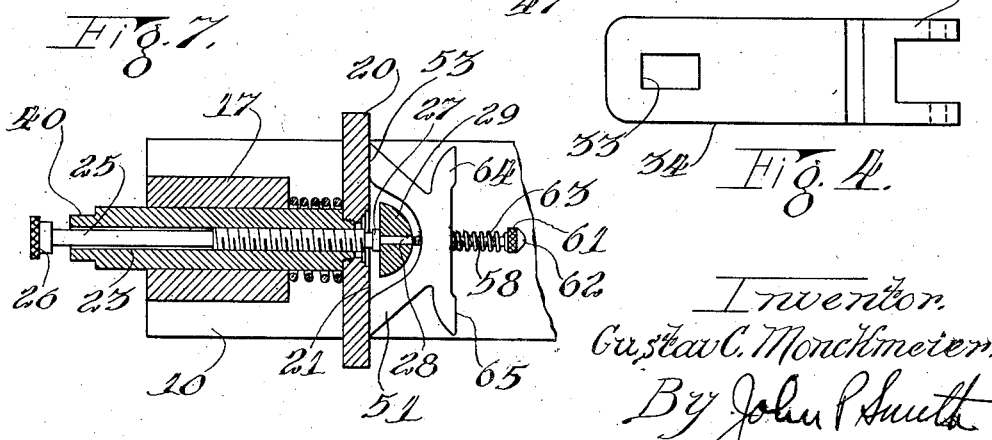

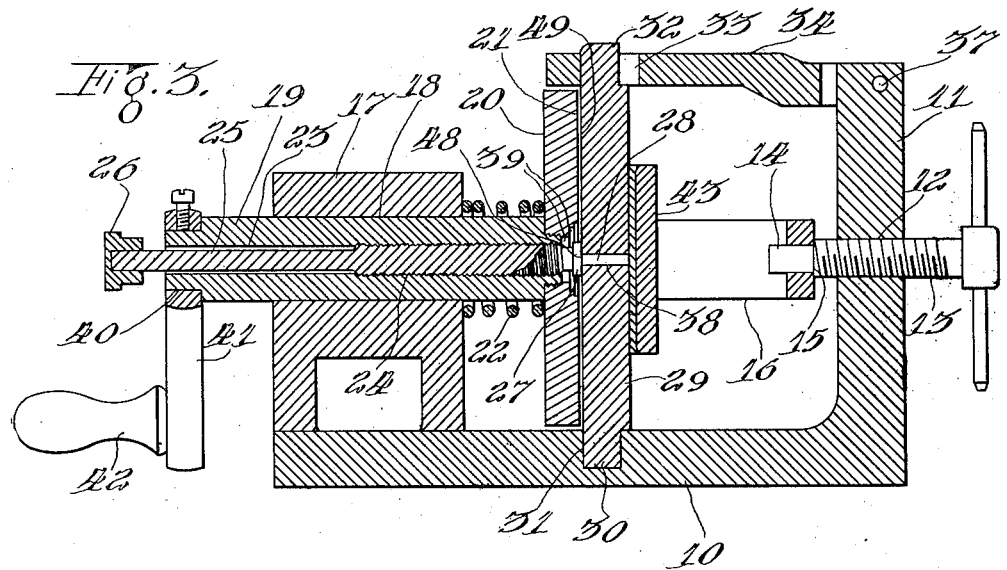
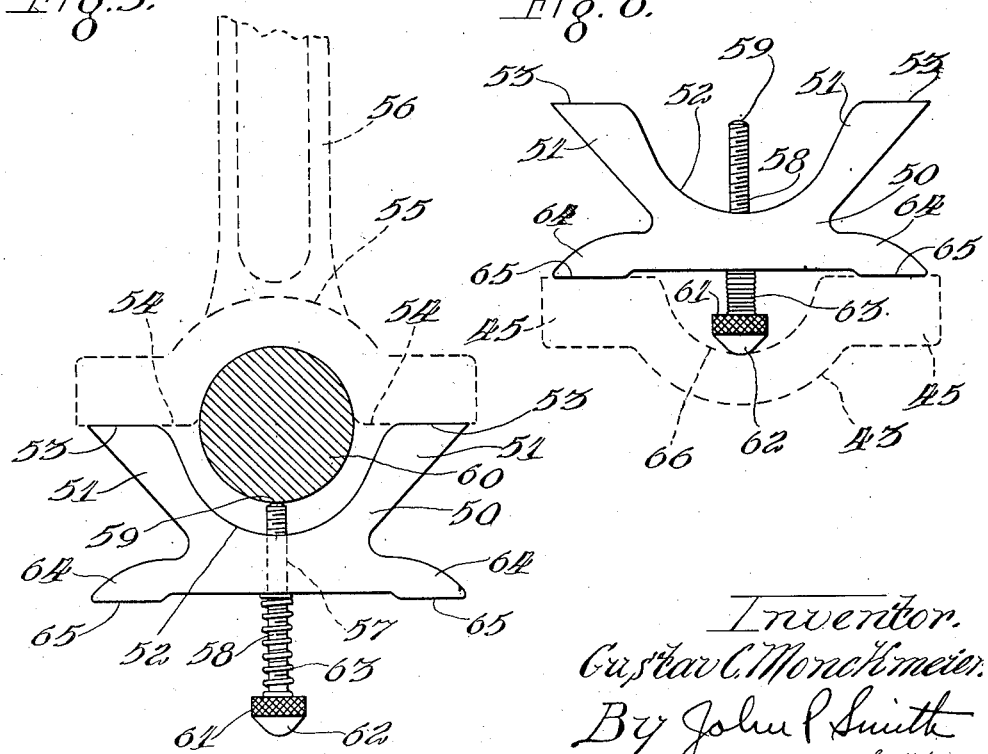

Patented Aug. 21, 1934

1,971,078

UNITED STATES PATENT OFFICE 1,971,078

BEARING CAP FINISHING DEVICE

Gustav C. Monckmeier, Tipton, Iowa

Application June 18, 1928, Serial No. 286,371

17 Claims. (Cl. 51—125)

The present invention is directed to a novel and improved form of bearing cap finishing device, and also to a supplemental instrument for gauging or measuring the amount of material to be finished off the cap and adjusting the finishing device by the measuring instrument so that when the cap is mounted in the finishing device, the exact amount of material will be removed from the cap.

Another object of the invention is to provide a novel and improved form of bearing cap finishing device in which the same may be readily adjusted so that only a predetermined amount of material is removed from the cap, as is indicated by the gauge or measuring instrument.

A still further object of the invention is to provide a novel and improved bearing cap finishing device which is simple in construction and permits easy and quick mounting on and removal of the cap.

A further object of the invention is to provide, in combination with my improved bearing cap finishing device, a gauge or measuring instrument which is adapted to measure the height of a shaft above the spaced apart surfaces of a half bearing. For example, the height of the crank shaft bearing above the surfaces of the two spaced apart bearings of a piston rod connection, after the cap has been removed. With this measurement on the instrument, the bearing cap finishing device may be adjusted so that only the proper and required amount of material is removed from the cap.

A still further object of the invention is to provide a novel and improved gauge or measuring instrument which can also be used to measure the concave depth of a cap with respect to the flat surfaces thereof.

These and other objects are accomplished by providing a construction and arrangement of the various parts in the manner hereinafter described, and particularly pointed out in the appended claims.

Referring to the drawings, Fig. 1 is a side elevational view showing the construction of my improved bearing cap finishing device.

Fig. 2 is a top plan view of same.

Fig. 3 is a vertical cross sectional view taken on the longitudinal center of the device shown in Fig. 1.

Fig. 4 is a detailed top plan view of the hinge member which locks the bearing cap supporting member in position.

Fig. 5 is a side elevational view showing the construction of my improved form of measuring instrument in which it is measuring the height of the crank shaft above the spaced apart surface of a piston rod connection (shown in dotted lines).

Fig. 6 is a side elevational view showing the employment of my improved measuring instrument, in which the depth or concave portion of a bearing cap is measured with respect to the spaced apart flat portions thereof, and Fig. 7 is a fragmentary top plan view, partly in cross section showing the manner in which the bearing cap finishing device is adjusted to the measuring instrument so that only the proper amount of material is removed from the cap.

The present invention is an improvement on my co-pending application, Serial No. 137,869, filed September 27th, 1926.

Heretofore, considerable difficulty has been experienced, as well as a great deal of loss in time and labor, in properly finishing bearing caps such as are used for main shaft bearings and piston rod connection bearings, in that no instrument heretofore has been provided for measuring or determining the amount of material to be removed from the bearing cap, and it has been necessary heretofore to remove a small portion of the material from the bearing cap and replace the cap many times on the co-operating other half of the bearing, in order to determine whether the proper amount of material has been removed. It is therefore a primary object of the present invention to overcome these difficulties and eliminate the necessity of repeatedly fitting the cap to determine whether the proper amount of material has been removed. With the present invention, I have provided a novel form of measuring instrument which accurately measures the height of the shaft above the two spaced apart surfaces to which the bearing is secured. Then this measurement, after once determined, is transferred to the bearing cap finishing device, which, by certain adjustments thereon, will permit only the amount of material to be removed from the cap, as determined by the measuring instrument.

In illustrating one form of my invention, I have shown the same as comprising a main frame or base member 10, which is adapted to be clamped in a vice or secured to a bench in any well known manner. Formed integrally with the base portion 10, on one end thereof, is a vertically extending portion or wall 11. Located centrally of the wall 11 is a threaded aperture 12 in which is mounted in threaded engagement a clamping screw 13. The inner end of the clamping screw 13 is provided with a reduced portion 14 forming a shoulder 15 on said screw. Journalled on the reduced portion 14 is a substantially U shaped yoke 16 which is adapted to engage the outer ends of the bearing cap in a manner hereinafter described. Formed integrally with, or secured to the base member 10, and preferably on the other end thereof, is a bearing portion 17 which has a longitudinal bore 18 extending therethrough. Journalled in the bore 18 is a shaft 19 to the inner end of which is secured in any well known manner, a revolving disc tool 20. The inner side as shown at 21 is provided with an abrasive or grinding surface which is adapted to engage the flat spaced apart surfaces of the bearing cap in the manner hereinafter described. Mounted between the inner surface of the bearing portion 17 of the outer face of the grinding tool 20, is a pressure spring 22 which normally presses the grinding tool in a direction toward the bearing cap. Extending longitudinally through the shaft 19 is a bore 23 which has its inner end thereof as shown at 24 threaded. Mounted in threaded engagement with the threaded portion 24 of the bore 23 is an adjusting rod 25 which extends outwardly beyond the end of the shaft 19, and has securely mounted thereon a knurled collar 26 for adjusting said rod with respect to said shaft. The inner end of the rod 25 is provided with a radially projecting annular flange 27. Extending from the flange 27 and formed integrally with the rod 25 is a horizontally projecting portion 28. Mounted adjacent the revolving tool 20 is a semi circular bearing supporting member 29. The lower end of the bearing cap supporting member is reduced in size and provided with a square cross section as shown at 30, which is adapted to seat in a square socket 31, formed substantially in the center of the base member 10. This square projection 30 of the semi circular bearing cap supporting member 29 prevents the same from turning after once seated in the socket 31 of the frame 10. The upper end of the bearing cap supporting member 29 is similarly provided with a square projection 32 which is adapted to be seated in a rectangular slot 33 formed on the free end of a hinged or locking member 34. The locking member 34 is provided with a bifurcated portion as shown at 35 which embraces an upwardly projecting portion 36 formed on the wall 11 of the frame. The member 34 is hinged by means of a pin 37 which extends through apertures formed in the bifurcated portion 35 of the hinge member and the projection 36 of the wall 11. Formed substantially in the center of the cap supporting semi circular member 29 is an aperture 38 through which the reduced portion 28 of the adjusting rod 25 is adapted to extend. The length of the projecting portion 28 of the adjusting rod 25 is equal to the depth or thickness of the semi circular bearing cap supporting member 29, as clearly shown in Fig. 3. The center of the abrasive surface 21 of the grinding tool 20 is provided with circular recesses as shown at 39 so as to permit the flange 27 to be withdrawn therein. The outer end of the shaft 19 is provided with a reduced non-circular end as shown at 40 for receiving a crank 41 thereon, which in turn is provided with a handle 42 for operating the tool.

For the purpose of illustration, I have shown a bearing cap 43 which comprises the usual semi circular portion 44 and the outwardly extending apertured eared portions 45, mounted on the semi circular supporting member 29 and clamped in position thereon by the legs 46 of the yoke 16 by the action of the clamp screw 13. From the above description it will be seen that with the bearing cap clamped in the position above described and illustrated in the drawings, that the turning of the crank 41 will grind the surfaces indicated at 47 of the bearing cap 43 by the inward action of the spring 22. This grinding will continue until the inner surface as indicated at 48, of the annular flange 27 engages the flat surface 49 of the semi circular bearing cap supporting member 29. It should be noted at this time that a cross section of the semi circular bearing cap supporting member 29 is just slightly less than a perfect semi circle, thereby permitting the adjustment of the flange 27 with respect to the tool so that a substantial variation of adjustments may be made for finishing the various sizes and types of bearing caps.

One of the essential features in connection with my improved bearing cap finishing device consists in the employment of a measuring instrument by which an exact measurement may be made of the place from which the cap has been removed, and this measurement transferred to the bearing cap finishing device, so that when the cap is finished on the device it will form an accurate finished bearing without any further regrinding. This novel measuring instrument, as illustrated in Figs. 5 and 6, comprises a substantially horizontal portion 50, which has formed integrally therewith two outwardly and upwardly diverging arms 51 so as to form a substantially semi circular shaped recess 52 therebetween. The upper portions of these arms 51 are flat as shown at 53 and occupy the same horizontal plane so that they may engage the flat apertured eared portions 54 of the bearing portion 55 of a piston rod connection bearing 56 shown in dotted lines in Fig. 5. Mounted in a threaded aperture 57 formed in the horizontal portion 50 of the instrument, is a threaded adjusting screw 58 which has one end thereof rounded as shown at 59 for engaging the bearing surface of a crank shaft 60. The adjusting screw 58 is provided with a knurled head 61 having a dome shaped top 62. This screw 58 is locked in various positions of adjustment by a compression spring 63 which is mounted between the head 61 of the screw in the horizontal portion 50 of the measuring instrument. When this measuring instrument is mounted in the position shown in Fig. 5 and adjusted so that the surfaces 53 of each of the arms 51 contact with the flat portion of the apertured eared portions 54 of the piston rod connection 56 and the inner end 59 of the screw contacting with the surface of the crank shaft 60, this measuring instrument is then transferred to the position shown in Fig. 7 in which the surfaces 53 of each of the arms 51 of the measuring instrument contact with the abrasive surface 21 of the disc tool 20. When in this position the thumb screw 26 is adjusted, thereby adjusting the rod 25 and with it, the extension 28 to contact with the inner end 59 of the adjusting screw 58 of the instrument, as clearly shown in Fig. 7. The bearing cap finishing device after being adjusted to the measurements of the instrument previously taken from the piston rod connection bearing as illustrated in Fig. 5, is now ready to accurately finish the bearing cap or to remove the proper amount of material from the bearing cap so as to accurately form a bearing with its cooperating parts without any further refitting or grinding. The bearing cap is mounted in position on the bearing cap finishing device by swinging the locking member 34 upwardly about its hinge 37 on the frame 10 and unscrewing the clamping screw 13 from the position shown in Fig. 3, and after the cap has been locked in the position shown in Figs. 1 and 2, the hinge or locking member 34 is swung into position where the slotted aperture 33 engages the square projection 32 of the semi circular member 29 after which the clamping screw is then adjusted to clamp the bearing cap in position. The surface of the bearing cap is then ground by turning the crank handle 42 and the material is ground off the surface by the spring 22 forcing the disc tool 20 against the bearing cap. This grinding action continues until the inner surface 48 of the annular flange 27 contacts with the flat surface 49 of the semi circular supporting member 29, and when the disc tool discontinues grinding the surface of the cap, the cap is then finished, or in other words, the material is removed therefrom in accordance with the measurement taken by the instrument.

In connection with my improved measuring instrument, I have provided means also for measuring the bearing portion or concave portion of a cap as indicated in Fig. 6. This comprises two outwardly projecting arms 64 which are formed integrally with the horizontal portion 50 of the instrument. These arms 64 are provided with flat portions 65 which are located in the same horizontal plane and these flat portions are adapted to engage the apertured eared portions 45 of the bearing cap 43, and the dome shaped head 62 may then be adjusted to contact with the bearing or concave portion 66 of the bearing cap. This additional construction to the instrument permits an accurate measurement of the amount of material finished off the cap, and if it becomes necessary to check the finished cap with the measurements taken off the piston rod connection two such instruments may be utilized. In other words, after the cap has been finished by the finishing device, a measurement may be taken in the manner indicated in Fig. 6 and checked with the instrument which took a measurement in the manner shown in Fig. 5, thereby accurately checking the finished bearing cap.

While I have illustrated and described an adjusting screw mounted in this instrument, it will, of course, be understood that a sliding friction rod may be used in place of the threaded screw in the instrument, and still be within contemplation of my invention.

In the above specification, it will be seen that I have provided a very simple and compact bearing cap finishing device together with a means for accurately measuring the amount of material to be finished for making the cap form a perfect bearing, and whereby said measurements may be transferred to the finishing device. This construction provides a very simple and accurate means for finishing bearing caps and reducing the amount of labor and time that is at present required.

While in the above specification I have described one embodiment which my invention may assume in practice it will, of course, be understood that the same is capable of modification, and that modification may be made without departing from the spirit and scope of the invention as expressed in the following claims.

What I claim as my invention and desire to secure by Letters Patent is:

1. A bearing cap finishing device comprising a frame, a cap supporting member mounted on said frame, a grinding tool mounted on said frame for grinding the surface of the bearing cap, and means carried by said grinding tool and engageable with said cap supporting member for determining the amount of material ground from said cap.

2. A bearing cap finishing device comprising a frame, a cap supporting member mounted on said frame, a grinding tool mounted on said frame for grinding the surface of the bearing cap, and means adjustably with respect to and carried by said grinding tool and engageable with said cap supporting member for limiting the amount of material ground from said bearing cap.

3. A bearing cap finishing device comprising a frame, a cap supporting member mounted on said frame, means for securing a bearing cap to said cap supporting member, a rotating tool mounted on said frame for grinding said bearing cap, and means extending through and rotatable with said tool and adjustable with respect thereto for determining the amount of material to be ground from said bearing cap.

4. A bearing cap finishing device comprising a frame, a cap supporting member mounted on said frame, means for securing a bearing cap to said cap supporting member, a shaft journalled on said frame, a revolving tool mounted on said shaft for grinding said bearing cap, and means mounted in said shaft and engageable with said cap supporting member for determining the amount of material to be ground from said bearing cap.

5. A bearing cap finishing device comprising a frame, a cap supporting member mounted on said frame, means for securing a bearing cap to said cap supporting member, a shaft journalled on said frame, a revolving tool mounted on said shaft for grinding said bearing cap, and means extending through and in threaded engagement with said shaft for adjusting the same with respect to said supporting member for determining the amount of material to be ground from said bearing cap.

6. A bearing cap finishing device comprising a frame, a cap supporting member mounted on said frame, means for clamping a bearing cap on said cap supporting member, a shaft journalled on said frame, a revolving tool secured to said shaft for grinding the surface of said cap, a rod adjustably mounted in threaded engagement with said shaft and adapted to contact said cap supporting member, and means for gauging the amount of material taken from said cap by the position said rod occupies with respect to said tool.

7. A bearing cap finishing device comprising a frame, a cap supporting member mounted on said frame, means for clamping a bearing cap to said cap supporting member, a shaft journalled in said frame, a finishing tool secured to said shaft, a rod adjustable longitudinal with respect to and extending through said shaft, and a flange formed on said rod and engageable with said cap supporting member for limiting the movement of said tool with respect to said cap, so that a predetermined amount of material is removed from said cap.

8. A bearing cap finishing device comprising a frame, a cap supporting member mounted on said frame, means for securing a bearing cap to said cap supporting member, a shaft journalled on said frame, a revolving tool mounted on said shaft for grinding said bearing cap, and means extending through a longitudinally bore in said shaft and adjustable with respect thereto and engageable with said cap supporting member for determining the amount of material to be ground from said cap.

9. A bearing cap finishing device comprising a frame, a cap supporting member mounted on said frame, means for clamping a cap on said cap supporting member, a shaft journalled on said frame, a revolvable abrasive tool carried by said shaft, adjustable means rotatable with said shaft and adjustable with respect thereto for limiting the movement of said tool with respect to said cap, a compression spring mounted between said tool and said frame for urging said tool toward said cap, and a measuring instrument adapted to engage said tool and said adjustable means, whereby a certain predetermined measured amount of material may be removed from said cap.

10. A bearing cap finishing device comprising a frame, a cap supporting member mounted on said frame, means for clamping a cap on said cap supporting member, a shaft journalled on said frame, a revolving abrasive tool carried by said shaft, an adjustable means extending through said shaft and adjustable with respect thereto for limiting the movement of said tool with respect to said cap, and a measuring instrument adapted to engage said tool and said adjustable means, whereby a certain predetermined measured amount of material may be removed from said cap.

11. A bearing cap finishing device comprising a frame, a cap supporting member mounted on said frame, means for clamping a cap on said cap supporting member, a shaft journalled on said frame, a revolvable abrasive tool carried by said shaft, longitudinally adjustable means carried by said shaft and adjustable with respect thereto for limiting the movement of said tool with respect to said cap, and a measuring instrument having a three point contact with said tool and said adjustable means for transferring certain measurement to said finishing device whereby a certain predetermined measured amount of material may be removed from said cap.

12. In combination with a bearing cap finishing device comprising a frame, a bearing cap supporting member mounted on said frame, means for securing a bearing cap to said supporting member, a grinding tool mounted on said frame, means adjustably associated with said grinding tool and engageable with the semi-circular surface of said cap for limiting the amount of material being removed from said bearing cap, and a measuring instrument for measuring the amount of material to be removed from said cap, comprising a member adapted to engage the spaced apart flat portions of the complementary portions of said cap, of an adjustable member adapted to engage the surface of the shaft of said complementary bearing, whereby the measurement thus secured by said measuring instrument may be transferred to said bearing cap finishing device, by having the flat portions of said instrument contact with said tool and having the adjustable means of said bearing cap finishing device adjusted to contact with the adjustable member of said instrument.

13. A machine for finishing the flat faces of bearings comprising a post segmental in cross section and supported at one end, an abutment movable toward and from the curved face of the post, a grinding mechanism opposed to and movable relative to the opposite side of the post, and means associated with said grinding mechanism and adapted to contact said post for determining the amount of material to be finished from said bearings.

14. A machine for finishing the flat faces of bearings comprising a base, a vertically projecting post on the base, said post having a curved side and a flat side, an adjustable abutment opposite the curved side, a grinding mechanism opposite the flat side, and means carried by said grinding mechanism and adapted to engage said post for limiting the material finished from said bearings.

15. A machine for finishing the flat sides of bearings comprising a base having a post extending upwardly therefrom and having a convex face and a flat face, an adjustable abutment opposite the curved face and having engaging members spaced beyond the side edges of the post, an adjustable grinding means opposite the flat side of the post, and adjustable means carried by said grinding mechanism and adapted to engage the flat side of said post for determining the amount of material to be removed from said bearings.

16. A machine for finishing bearings comprising a frame, a post mounted on said frame and having a cross-sectional shape no greater than a semi-circle, movable seating abutments beyond the sides of the post, a grinding tool opposite the flat face of the post, and adjustable means extending through said tool and engageable with said post for controlling the amount of material removed from said bearings.

17. A machine for finishing bearings comprising a member on which a bearing can rock, spaced means for clamping a bearing on said member engaging the bearing beyond the side dimensions of the member and thereby seating and holding the bearing, a grinding tool on the opposite side of the member, and an adjustable member extending through said tool and engageable with said first named member for limiting the amount of material to be removed from said bearing.

GUSTAV C. MONCKMEIER.